UNITED STATES PATENT OFFICE.

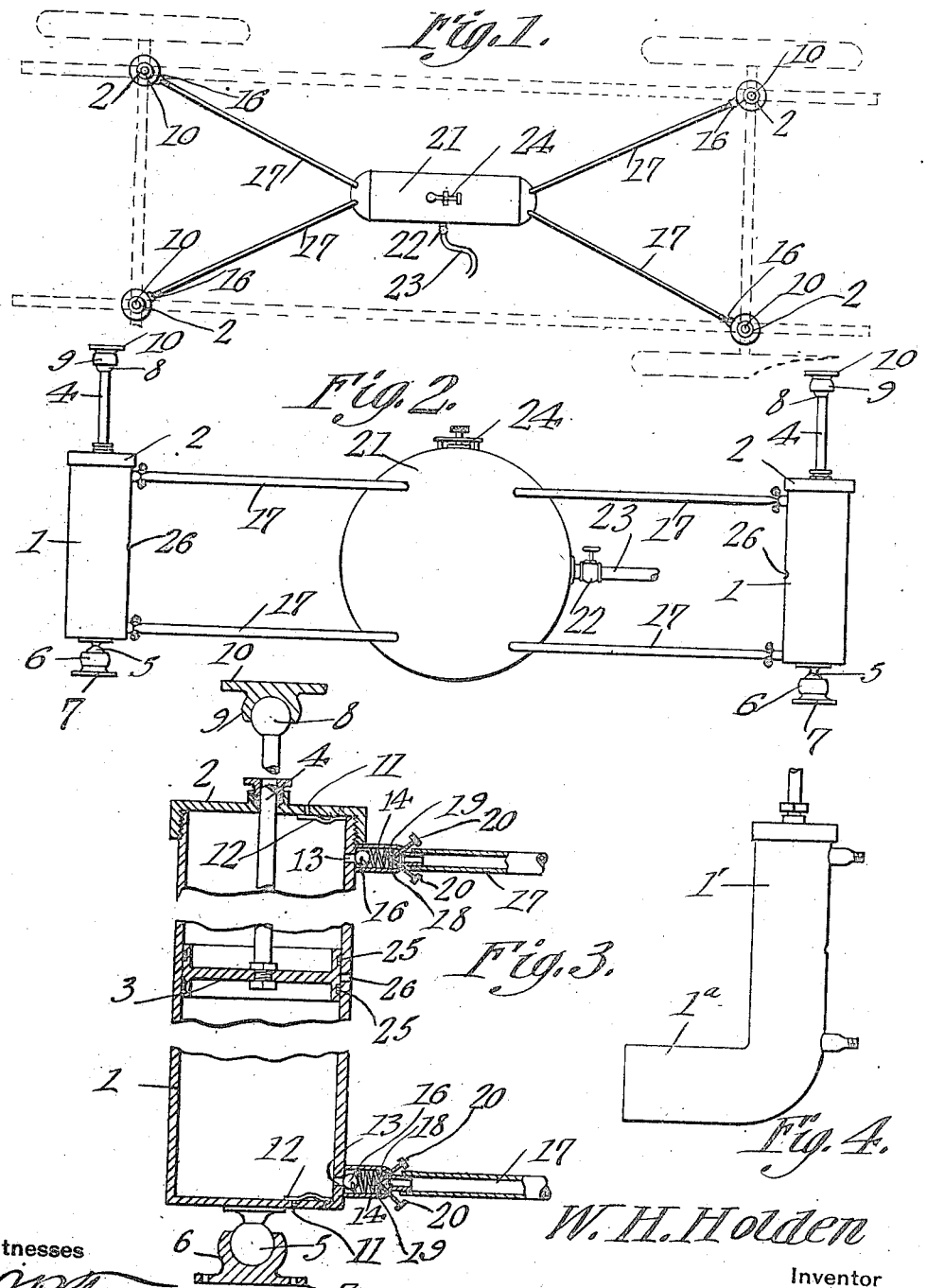

WILLIAM H. HOLDEN, OF IDAHO FALLS, IDAHO.

PNEUMATIC SHOCK-ABSORBER AND AIR-COMPRESSOR.

1,247,835.

Specification of Letters Patent.  Patented Nov. 27, 1917.

Application filed December 27, 1915. Serial No. 68,752.

*To all whom it may concern:*

Be it known that I, WILLIAM H. HOLDEN, a citizen of the United States, residing at Idaho Falls, in the county of Bonneville and State of Idaho, have invented a new and useful Pneumatic Shock-Absorber and Air-Compressor, of which the following is a specification.

The present invention is an apparatus adapted for use upon automobiles and other vehicles for absorbing the shocks and also acting as an air compressor, whereby air is supplied to an air tank, which can be used for inflating the tires, operating a horn or other signal, operating a pneumatic engine starter, and the like.

It is the object of the invention to provide a novel and improved yet simple and effective attachment for motor-propelled and other vehicles, whereby a cushioning effect is accomplished between the frame and axles, and at the same time air is forced under pressure into a centrally located tank from which the compressed air can be discharged for the uses above indicated.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the appliance.

Fig. 2 is an enlarged end view thereof.

Fig. 3 is an enlarged sectional view of one of the cylinders, portions being broken away.

Fig. 4 is an elevation of a modified form of cylinder.

In carrying out the invention, there are provided four upright or vertical cylinders 1, one for each corner of the vehicle. The lower ends of the cylinders 1 are closed, and the upper ends thereof have caps 2 threaded or otherwise secured thereon. Pistons 3 are slidable snugly within the cylinders, and upwardly projecting piston rods 4 are attached to the pistons and pass slidably through the covers or upper ends of the cylinders.

The lower ends of the cylinders and the upper ends of the piston rods 4 are attached to the axles and frames, respectively, or other suitable parts of the vehicle which move vertically relatively to one another. As a convenient means for attaching the cylinders and piston rods to the respective parts, balls 5 are attached to the lower ends of the cylinders 1 and work in sockets 6 of plates 7 which are attachable to the axles of the vehicle, to provide a ball and socket connection between the cylinders and axles. Balls 8 are attached to the upper ends of the piston rods 4 and work within sockets 9 of plates 10 which are attachable to the frame of the vehicle, so as to provide a ball and socket connection between the piston rods and frame. Although the ball and socket connections are illustrated, it will be understood by those skilled in the art, that various other equivalent connections can be used, for the same purpose. Thus, as the frame of the vehicle vibrates vertically relatively to the axles, the pistons are reciprocated within the cylinders, which is utilized for providing pneumatic cushions, and for compressing the air.

The upper and lower ends of each cylinder are provided with inlet apertures or ports 11 and flap valves 12 which are riveted or otherwise secured interiorly to the ends of the cylinders and having their free portion normally seating against the ends of the cylinder to close the ports 11. The valves 12 are preferably constructed of sheet metal. It is the duty of the flap valves 12 to unseat when the piston moves away from them, said valves being opened by the suction created by the piston. When the piston starts downward, the upper flap valve 12 is unseated to open the upper port 11, and as soon as the suction ceases, said upper port will be closed due to the seating of the upper valve 12, said valve being held seated by its spring tension and by the compression of the air within the cylinder. The valves 12 may be faced with rubber or other equivalent material to prevent leakage, and the valves are made of proper size and strength to suit the circumstances, the ports 11 also being of appropriate size. The flap valves are so made as to have sufficient resiliency to close their ports at all times, except when the valves are opened by the air suction. When the suction is created, air rushes in, due to the tendency to create a vacuum, and as soon as the suction stops, the valves are seated quickly and effectively.

Each cylinder is also provided at its inner side and adjacent its upper and lower ends with air outlet ports 13, and outstanding valve casings 14 have their inner ends attached to said side of the cylinder around the ports 13, and the free ends of said casing 14 are reduced for the attachment or connection thereon of suitable flexible tubes 17. Ball valves 16 are disposed loosely within the casings 14 and are seatable against the casings to close the ports 13, said valves 16 being seated by the air suction, and also by coiled wire expansion springs 19 disposed between said valves and apertured seats 18 adjustable or slidable within the casings 14. Adjusting screws 20 are threaded diagonally through the shoulders of the casings 14 to bear against the seats 18 for adjusting them, to regulate the tension of the springs 19. The valves 16 provide check valves to permit the air to flow through the ports 13 from within the cylinder, but to prevent the air from flowing back into the cylinder from the casings 14. These safety valves can be regulated, by adjusting the screws 20 inwardly or outwardly, as the case may demand, whereby to adjust the valves for greater or less pressure. The screws are adjustable from the outside so as to tighten or stiffen the springs 19 when the screws are threaded inwardly, thereby requiring a greater air pressure to open or unseat the valves 16. In case that the vehicle is heavily loaded, greater pressure and air resistance is required in the compression chambers of the cylinder before the air is permitted to escape through the ports 13. When the vehicle is lightly loaded or not loaded at all, then the screws can be unscrewed for greatly reducing the tension of the springs 19, thereby enabling less air pressure to unseat the valves 16. The screws 20 can thus be adjusted to suit the various loads and other conditions.

The valves 12 provide check valves controlling the inlet ports, while the valves 16 provide check valves controlling the outlet ports of the cylinders, so that the air is drawn into the cylinders through the ports 11, and is forced out of the cylinders to the ports 13 into the tubes 17. Various forms of check valves can be used with the same general result.

The tubes 17 converge to a central air tank 21, and have their adjacent ends attached to the ends of said tank which is preferably disposed longitudinally, as seen in Fig. 1. The tank 21 has an outlet valve 22 at one side to which a tube 23 is connected, and the tank 21 is provided with an escape valve 24, which will be opened when the pressure of the air rises beyond a predetermined number of pounds, to avoid an excessive pressure, which is liable to rupture the tank.

The piston of each cylinder is made sufficiently thick or long to enable it to carry two non-leak piston rings 25, one adjacent the upper edge and the other adjacent the lower edge of the piston. The cylinder 1 is also provided between its ends with a port or vent 26, and when the piston is in normal position, one of its piston rings is above and the other is below the port 26. The port or vent 26 is of a size proportional to the size of the cylinder, and the conditions. It is evident that if the piston is moved either upwardly or downwardly away from the port 26, said port is uncovered, and the air in the chamber communicating with said port 26 can escape through said port to allow the piston to return to normal position. Said port 26 is normally closed by the piston. As the piston reciprocates within the cylinder none of the compressed air can escape through the port 26, except to allow the piston to return to normal position. The piston in moving away from the port 26 in either direction will compress the air.

The caps 2 may be provided with stuffing boxes or packing means 27 to prevent leakage through the apertures through which the piston rods are slidable.

In operation, as above indicated, when the frame of the vehicle vibrates relative to the axles, the pistons are reciprocated within the cylinders. The action in all of the cylinders is the same, and considering one cylinder, when the piston thereof moves downwardly, the upper valve 12 is opened so that air is sucked into the upper portion of the cylinder, while the upper check valve 16 is seated, to prevent the flow of air from the tank 21 into the cylinder above the piston. The lower valve 12 is seated so that the air below the piston is compressed, and the lower valve 16 is forced open when the air is compressed, to force the air through the respective lower tube 17 into the tank 21. When the piston 3 is moved upward within the cylinder, the lower valve 12 is opened to admit air below the piston, and the lower valve 16 is seated to prevent air passing backwardly from the tank 21 into the cylinder below the piston. The upper valve 12 is closed, so that the air is compressed within the cylinder above the piston, and the upper valve 16 is unseated by the compressed air so that the air is forced into the tank 21. Thus, upon the upper and downward movements of the pistons within the cylinders, the air within the cylinders being compressed will provide air cushions, and the air passing through the restricted inlet and outlet ports of the cylinders will thus serve to absorb the shocks which would otherwise occur. At the same time, the compressed air is forced into the tank 21, from all of the cylinders, and the air within the tank is thus compressed more and more. Should the pressure of the air within the tank 21 become excessive, the escape valve 24 opens, and allows the surplus air to escape.

The compressed air within the tank 21 can be used for inflating the tires, the tube 23 being readily applied to the valve barrels of the tires, and it is to be understood that the compressed air can also be used for operating a horn or other signal, a pneumatic engine starter, or other device. The apparatus is therefore not only useful as a shock absorber, but it also serves in the capacity of an air compressor, whereby the apparatus is made to perform two useful functions.

Where it is desirable to provide enlarged air chambers, the end portions of the cylinder can be enlarged in any suitable manner. Thus, as suggested in Fig. 4, the end of the cylinder 1' can be provided with a lateral extension 1ª to increase the respective air chamber, and if desired both ends of the cylinders may be provided with such extensions or enlargements of any suitable character.

Having thus described the invention, what is claimed as new is:

A shock absorber embodying a cylinder having air inlet and outlet ports adjacent to each end and a vent aperture intermediate its ends permanently open into the atmosphere, check valves for said ports, adjustable means for yieldably holding the check valves of the outlet ports seated to regulate the pressure necessary to unseat them, a piston working in the cylinder normally in an intermediate position closing said aperture and movable in either direction, and a piston rod connected to the piston slidable through one end of the cylinder, said aperture serving to admit and release air from that end of the cylinder from which the piston has been moved, and confining the forcing of air from the cylinder through that outlet port only nearest which the piston is located.

In testimony that I claim the foregoing as my own, I have hereto affixed my signature in the presence of two witnesses.

WILLIAM H. HOLDEN.

Witnesses:
 RALPH ECKHARDT,
 DAVID L. BLEVINS.